March 9, 1965  H. D. FERGUSON, JR  3,172,998
HEATING APPARATUS
Filed June 27, 1962

INVENTOR.
HARRY D. FERGUSON JR.
BY
Harry W. Hargis III
AGENT

3,172,998
HEATING APPARATUS

Harry D. Ferguson, Jr., Ambler, Pa., assignor to Philco Corporation, Philadelphia, Pa., a corporation of Delaware
Filed June 27, 1962, Ser. No. 205,641
5 Claims. (Cl. 219—515)

This invention relates to heating apparatus, and more particularly to temperature control means for heating apparatus. While of broader applicability the invention is especially useful in cooking ranges.

In cooking ranges it has been known to provide a so-called "hold-warm" feature whereby a predetermined reduced non-cooking temperature may be maintained, following completion of a cooking period at an elevated temperature.

It is an objective of this invention to provide simple and effective control means for achieving the above-described hold-warm feature.

It is another objective of the invention to achieve simple and effective means for providing selectivity of operation of a hold-warm feature in a cooking range.

It is a still further objective of the invention to provide improved electro-mechanical means for switching from a cooking function to a hold-warm function.

In achievement of the foregoing as well as other objectives, the invention comprises, in a preferred embodiment, the combination of a cooking chamber or oven, means for heating the oven, a timer, means including a temperature control for maintaining energization of said heating means at an elevated cooking temperature, and selectively operable control means comprising extremely simple, positive and inexpensive timer controlled switching means and thermostatically actuated linkage means energizable by the latter for accommodating automatic reduction in the temperature setting of said temperature control, whereby to provide a reduced non-cooking temperature period following a cooking period.

The foregoing as well as additional objectives and advantages of the invention may best be understood from a consideration of the following description taken in light of the accompanying drawing in which.

Figures 1, 3:
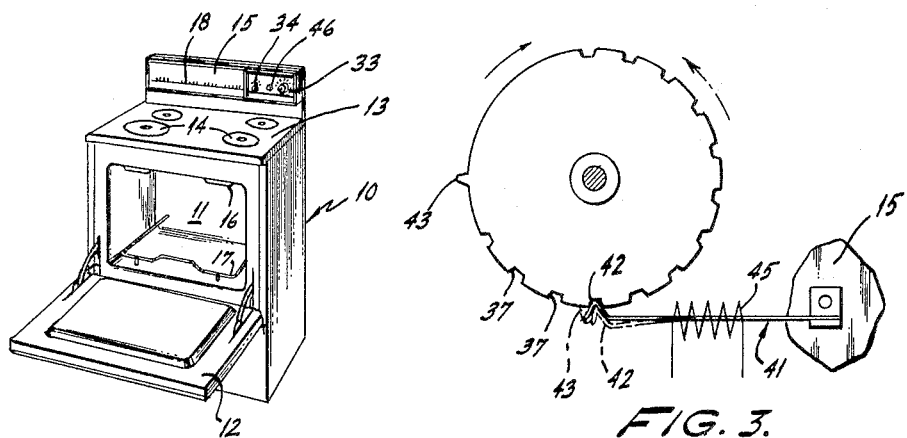
FIGURE 1 is a perspective showing of cooking range apparatus including elements of the control circuit embodying the invention.
FIGURE 3 is an elevational showing of a portion of control apparatus illustrated in FIGURE 2, and illustrates an operational feature thereof.

With more particular reference to the drawing, and first to FIGURE 1, the invention is, for illustrative purposes, embodied in an electric range comprising a cabinet 10 including an oven compartment 11 and a door 12 for closing the same. The top wall 13 of cabinet 10 is provided with conventional surface units 14, and a back-splash panel 15 houses push-button controls 18 for the units. Units 14 and controls 18, while shown in the interest of a more complete understanding of preferred range structure embodying the invention, form no part of the present invention and will not be described further in the present disclosure.

Figure 2:
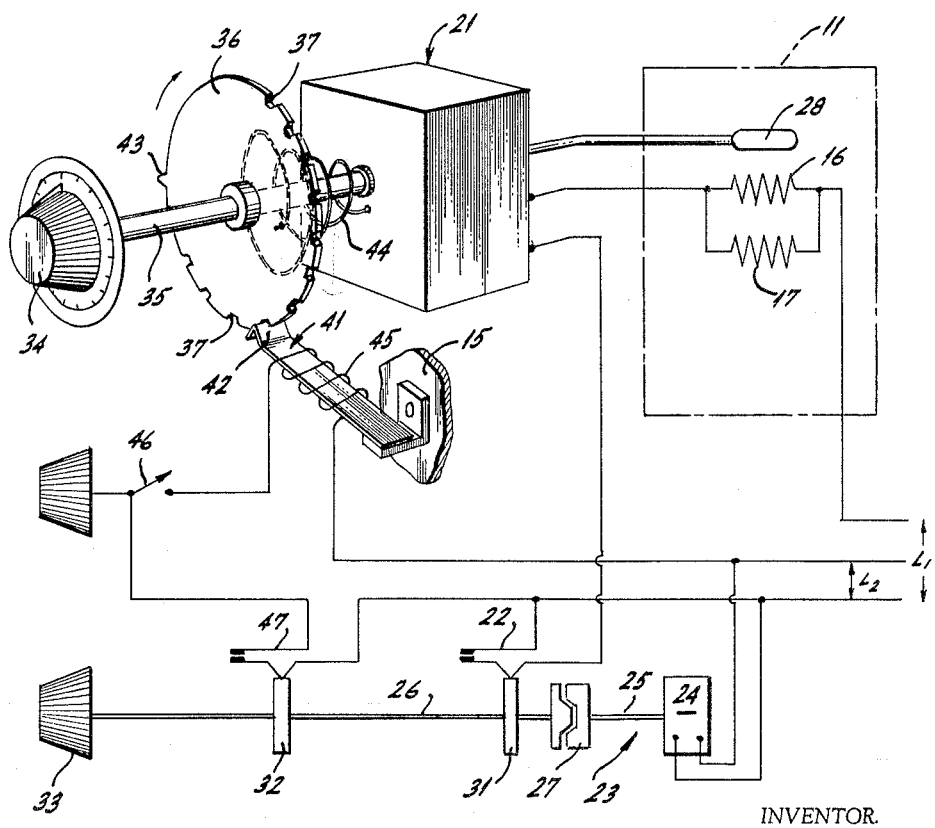
FIGURE 2 is a diagrammatic showing of an electrical control circuit embodying the invention.

In particular accordance with the invention, and further with reference to the somewhat diagrammatic showing of electric and control elements shown in FIGURES 2 and 3, a pair of electrical resistance heating elements 16 and 17 are disposed and arranged within oven compartment 11 to heat the same. Heating elements 16 and 17 are connected in parallel electrical circuit with one another and are disposed in series electrical circuit with: a source of energy L–1, for example a 230 volt line; a thermostatically actuated, adjustable control switch 21; and a switch 22 actuatable either by a timer 23 or manually by a knob 33 as will hereinafter be more fully explained.

Timer 23 includes an electric motor 24, such for example as an electric clock motor, connected in series electrical circuit with a source of energy L–2, for example a 115 volt line. A first shaft 25 is driven by motor 24 and is releasably coupled to a second shaft 26 by a clutch device 27. A pair of cams 31 and 32 are mounted for rotation with shaft 26. Cam 31 is disposed and adapted periodically to actuate switch 22, which is in series electrical circuit with the thermostatic control switch 21, in accordance with preselected positions of the cam as determined by initial positioning of the shaft 26 by manually rotatable knob 33. Cam 32 is disposed and adapted to actuate a switch 47, the purpose and function of which switch will be more fully explained later in the description.

Thermostatic control switch 21 comprises a conventional bulb-type temperature sensing element 28 disposed in suitable heat exchange relation with the oven compartment 11 and connected with a bellows (not shown) adapted to operate the switch in accordance with sensed temperatures. Control switch 21 is adjustable between a plurality of preselected cooking temperatures by a rotatable shaft 35 having a knob 34 affixed thereto. Shaft 35 carries a wheel 36 provided with plurality of notches 37 spaced along its periphery in correspondence to preselected temperature values at which thermostatic switch 21 will operate cyclically to energize and deenergize the heating elements 16 and 17.

A resilient arm 41 is mounted in cantilever fashion to back splash panel 15 and includes a bent portion 42 receivable within each of notches 37 and urged against the wheel. The construction and arrangement is such that as knob 34 is rotated, the suitably formed end portion 42 of resilient arm 41 will follow the contour of wheel 36 and ride into and out of notches 37. Resilient arm 41 will therefore hold notched wheel 36 in any of the corresponding preselected temperature positions by engagement of the bent portion 42 with a corresponding notch 37. A stop is provided, as seen at 43, to position the shaft in correspondence with a predetermined hold-warm, non-cooking temperature, for example 170° F.

A coiled spring 44 is axially aligned with thermostatic control shaft 35 and has one end attached to the body portion of the control switch 21 and its other end attached to notched wheel 36. The construction and arrangement is such that clockwise movement of thermostatic control knob 34 (see solid arrows, FIGURES 2 and 3) to preset the cooking temperature, will cause spring 44 to be wound up and to store energy tending to turn the knob in the opposite direction, toward a lower temperature. However, the force of portion 42 of the resilient arm against a notch 37 of the wheel is sufficient to prevent the spring 44 from returning wheel 36 and the thermostatic control shaft 35 to the wheel stop position 43 corresponding to the lower, hold-warm temperature.

In further particular accordance with the invention, the resilient arm 41 comprises a bimetallic strip which is so arranged that when it is heated to a predetermined temperature it will bend away from notched wheel 36 to the broken line showing of FIGURE 3, thereby releasing the wheel so that the thermostatic control shaft 35 will be rotated by spring 44 (see broken arrow, FIGURE 3) to set the thermostatic switch at its preset hold-warm temperature position as also indicated by broken lines in FIGURE 3. Means for heating resilient arm 41 comprises a resistance heater element 45 wrapped about the arm and connected in series electrical circuit with: voltage source L-2; a manually operable selector switch 46; and a switch 47 operated by second cam 32 provided on timer shaft 26.

With switch 46 closed to select the hold-warm feature, the construction and arrangement of the electrical circuit is such that, when the timed cooking period is completed, cam 32 closes switch 47 and heater 45 is thereby energized to bend resilient bimetallic strip 41 to its broken line position (FIGURE 3). Notched wheel 36 is released by movement of strip 41 and the control is reset by spring 44 to the hold-warm temperature position afforded by abutting engagement of stop 43 with the portion 42 of thermally deflected strip 41, as shown in FIGURE 3.

If the hold warm feature is not to be used, the operator need only move switch 46 to its open position. In any event, a cooking or hold-warm period can be halted by disengaging the clutch 27 and turning timer knob 33 to open switch 22.

If desired, switch 22 may be eliminated from the timer and embodied in thermostatic control 21. In such a modification, an overall timed cooking and hold-warm period would be eliminated and deenergization would be achieved by manually resetting the thermostatic control to an "off" position.

It will therefore be appreciated that the invention provides simple and effective control means for obtaining selectively actuatable hold-warm means in a cooking range through a novel timer and thermostatic control arrangement requiring a minimum of mechanical linkages.

While a preferred embodiment of the invention has been illustrated, it will be understood that such modifications are contemplated as fall within the scope of the appended claims.

I claim:

1. In cooking range apparatus, the combination comprising: an oven; an electric heater for said oven; a source of electrical energy; temperature responsive electrical switch means for cyclically connecting said heater to said source of energy, said switch means including rotatable wheel and shaft means movable between a rest position and a plurality of other positions and adapted upon being moved to modify the temperatures at which said switch operates to cycle said heater; spring means disposed and adapted to urge said wheel and shaft means from any of said plurality of positions to said rest position; a flexible and resilient bimetallic strip disposed in forcible frictional engagement with said wheel and adapted to maintain the position of said shaft means against the force of said spring means; and heater means energizable and adapted to heat said bimetallic strip to bend it away from said wheel and shaft means, whereby to accommodate return of the latter by said spring means to said rest position.

2. Apparatus according to claim 1 and further including a timer and switch means actuatable thereby adapted to connect said heater means to said source of energy after a predetermined period of energization of said heater for said oven.

3. In combination with a cooking chamber: means for heating said cooking chamber; means including a temperature control adjustable to a plurality of temperature controlling positions and operably associated with said means for heating to maintain energization of the latter at an elevated cooking temperature to provide a cooking period; means urging said temperature control from a selected one of its controlling positions toward a predetermined lower temperature controlling position; a timer; switching means controlled by said timer; thermostatically actuated detent means operable normally to maintain said temperature control in its selected controlling position; and a heater for modifying the temperature of said detent means to actuate the latter and release said temperature control for movement to its lower temperature controlling position, said heater being energizable by said timer controlled switching means to accommodate the last recited movement of said temperature control, whereby to provide a reduced temperature period following a period at the mentioned elevated temperature.

4. Apparatus according to claim 3 and further characterized in that said thermostatically actuated detent means comprises a bimetallic strip disposed for frictional resilient engagement with adjustable elements of said temperature control, and further including spring means disposed and adapted to return the adjustable elements from the mentioned elevated temperature controlling position to the lower temperature controlling position in response to a reduction in force exerted upon the adjustable elements by said bimetallic strip.

5. In combination with a heatable chamber: means for heating said chamber; means including a temperature control adjustable to a plurality of temperature controlling positions and operably associated with said means for heating to maintain energization of the latter at a first temperature; means urging said temperature control from a selected one of its controlling positions toward a predetermined different temperature controlling position; a timer; switching means controlled by said timer; thermostatically actuated means operable to maintain said temperature control in its selected controlling position; and means for modifying the temperature of said thermostatically actuated means to actuate the latter and release said temperature control for movement to said different temperature controlling position, said last named means being energizable by said timer controlled switching means to accommodate the last recited movement of said temperature control, whereby to provide a period of operation at said different temperature following period of operation at said first temperature.

References Cited by the Examiner

UNITED STATES PATENTS

| 1,702,480 | 2/29 | Newsom | 219—441 |
| 2,767,293 | 10/56 | Jordan et al. | 219—515 |

RICHARD M. WOOD, *Primary Examiner*,